United States Patent [19]

Ishida et al.

[11] Patent Number: 5,243,524
[45] Date of Patent: Sep. 7, 1993

[54] METHOD AND APPARATUS FOR CONTROLLING A VEHICLE AND ACCOUNTING FOR SIDE-SLIP ANGLE

[75] Inventors: Shinnosuke Ishida; Akihiko Takei, both of Saitama, Japan

[73] Assignee: Honda Giken Kogyo Kabushiki Kaisha, Tokyo, Japan

[21] Appl. No.: 670,742

[22] Filed: Mar. 15, 1991

[30] Foreign Application Priority Data

Mar. 15, 1990 [JP] Japan .................................. 2-64587

[51] Int. Cl.⁵ ............................................ G01F 15/50
[52] U.S. Cl. ............................. 364/424.02; 364/456; 180/169; 358/103
[58] Field of Search ....................... 364/424.01, 424.02, 364/443, 449, 456; 358/103; 318/587; 382/1; 395/905, 94; 180/167–169

[56] References Cited

U.S. PATENT DOCUMENTS

| | | | |
|---|---|---|---|
| 4,969,036 | 11/1990 | Bhanu et al. | 358/103 X |
| 5,101,351 | 3/1992 | Hattori | 364/424.02 |
| 5,122,957 | 6/1992 | Hattori | 364/424.02 |
| 5,163,002 | 11/1992 | Kurami | 364/424.02 |
| 5,172,315 | 12/1992 | Asanuma et al. | 364/424.02 |

FOREIGN PATENT DOCUMENTS 0248704 2/1990 Japan .

OTHER PUBLICATIONS

Liu et al., "On Lateral Control of Highway Vehicles Guided by a Forward Looking Sensor," International Conference on Applications of 1989, Department of Mechanical Engineering, University of California at Davis, Dec. 1989, pp. 119–124.

Davis et al., "Road Boundary Detection for Autonomous Vehicle Navigation," Optical Engineering, vol. 25 No. 3, Mar. 1986, pp. 409–414.

Primary Examiner—Thomas G. Black
Assistant Examiner—Thomas S. Auchterlonie
Attorney, Agent, or Firm—Lyon & Lyon

[57] ABSTRACT

Disclosed is an automatic travelling apparatus which is capable of taking an image of an area ahead of a vehicle in its running direction by an image pick-up device fixed to the vehicle; determining, by processing the taken image, a permissible travel path in a X-Y coordinates having the Y-Axis corresponding to the axis of the vehicle's running direction; setting a target course in the determined permissible travel path; estimating a steering amount necessary for permitting the vehicle to follow the target course on the basis of the detected running condition of the vehicle; and steering the vehicle to follow the target course with reference to the steering amount; and also is capable of determining a side-slip angle of the vehicle and turning any one of patterns—image, permissible travel path and the target course—by the determined side-slip angle to coincide the actual running direction of the vehicle with the direction of the Y-axis.

7 Claims, 6 Drawing Sheets

METHOD AND APPARATUS FOR CONTROLLING A VEHICLE AND ACCOUNTING FOR SIDE-SLIP ANGLE

BACKGROUND OF THE INVENTION

The present invention relates to an automatic travelling apparatus capable of identifying a permissible travel path for the purpose of permitting a vehicle to automatically run along a road.

Recently, there has been developed an automatic travelling apparatus which is capable of identifying a permissible travel path, setting a target course thereon, and steering a vehicle to follow the target course.

The automatic travelling apparatus disclosed in Japanese laid open patent publication No. 199610-88 generates an image of an area ahead of a vehicle in its running direction using an image pick-up device which is fixed to the vehicle. The apparatus determines, by processing the generated image, a permissible travel path in an X-Y coordinate system wherein the Y-axis corresponds to the axis of the vehicle's running direction. The apparatus sets a target course in the determined permissible travel path, and estimates an amount of steering necessary to permit the vehicle to run along the target course based on a currently detected running condition of the vehicle.

While negotiating a curve, the vehicle whereon the above-mentioned apparatus is mounted may encounter slippage depending on its running speed. Thus, the monitoring direction of the image pick-up device may deviate from the actual running direction of the vehicle. The difference between the monitoring direction of the image pick-up device and the actual running direction of the vehicle is referred to as the side-slip angle.

Accordingly, while the vehicle runs with a side-slip angle, the image pick-up device can not monitor the actual course of the vehicle, that is, the Y-axis of the X-Y coordinates does not stand for the actual running direction. If in such a situation a steering correction is estimated with respect to a target course set in a permissible travel path, the steering correction may contain an error corresponding to the side-slip angle of the vehicle, thereby inhibiting the ability of the vehicle to follow the target course.

SUMMARY OF THE INVENTION

In view of the foregoing, the present invention was made to provide an automatic travelling apparatus which is capable of permitting a vehicle to follow a target course by accurately steering in consideration of possible side-slip angle of the vehicle.

DESCRIPTION OF THE PREFERRED EMBODIMENTS

Figure 1:
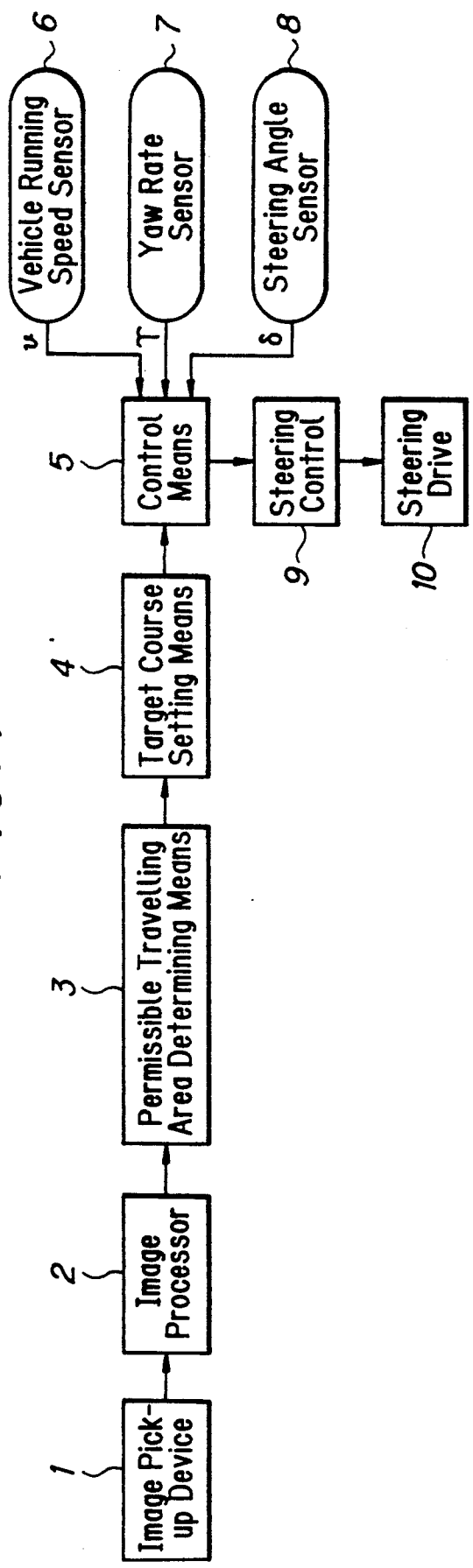
FIG. 1 is a block diagram showing a structure of an automatic travelling apparatus embodying the present invention.

Referring now to the drawings, a preferred embodiment will be described in detail.

In FIG. 1, an automatic travelling apparatus according to the present invention comprises: an image pick-up device 1 such as a video camera attached to a vehicle for continuously generating an image of a road or path ahead of the vehicle; an image processor 2 for processing the images taken by the image pick-up device 1 to extract therefrom segments of continuous lines such as road edges; permissible travel path determining means 3 for determining, on the basis of the obtained continuous line segments, a permissible travel path such as a road in the direction in which the vehicle is to travel; target course setting means 4 for setting a target course in the permissible travel path thus determined; control means 5 for determining the instantaneous running condition of the vehicle on the basis of an output signal from a speed sensor 6 representing the vehicle's running speed "v", an output signal from a yaw rate sensor 7 representing the yaw rate "T," and an output signal from a steering angle sensor 8 representing the tire angle "δ" which varies with the steering of the vehicle, and for estimating, on the basis of the instantaneous running condition, a steering amount for permitting the vehicle to follow the target course; and steering control means 9 (and a steering drive 10) for steering the vehicle with reference to the steering amount.

Actually, a microcomputer aided control circuit is used in place of the image processor 2, the permissible travel path determining means 3, the target course setting means 4, and the control means 5. Further, the steering control means 9 can be included in the microcomputer aided control, if occasions demand.

The extraction of continuous line segments such as road edges from the generated image in the image processor 2 can be made as follows:

First, each image supplied from the image pick-up device 1 is subjected to a differentiation process to detect the road edges. Then, an automatic threshold setting circuit in the image processor 2 sets an optimum threshold value in consideration of the degree of shade of the road edge image information just processed. The road edge image will be subjected to binary transformation.

Alternately, first, the image may be subjected to binary transformation, and then the binary data may be subjected to differentiation. In place of binary transformation poly-digitization may be performed to express some shade details of the image.

Figure 2:
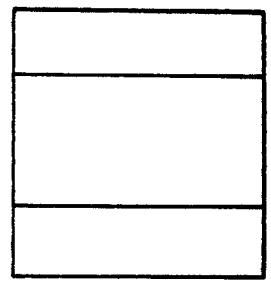
FIG. 2 shows a line segment of a road obtained by processing data of an image taken by a video camera.

Digitalized image information will be subjected to the well known Hough conversion to convert the X-Y linear coordinates to corresponding ρ-θ point coordinates, thus transforming the isolated points into continuous line segments representing the edges of the road as shown in FIG. 2.

Figure 8:
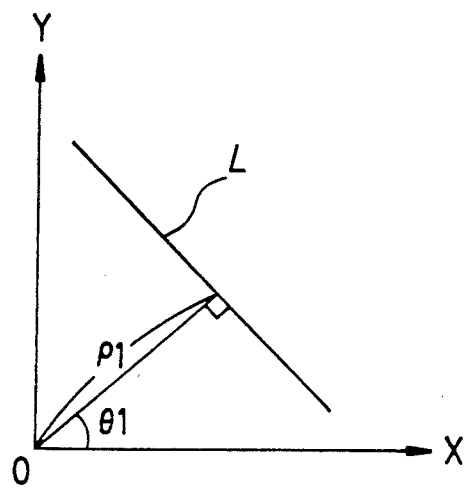
FIG. 8 shows a line segment in the X-Y coordinates.
Figure 9:
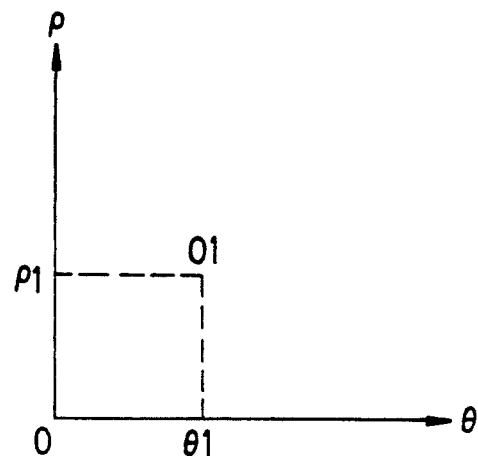
FIG. 9 shows a point in a P-θ coordinate system obtained by the Hough conversion of the line segment shown in FIG. 8.

The symbol θ stands for an angle formed between the X-axis and a perpendicular line drawn from the origin of the X-Y coordinates to a line segment L, and ρ stands for the length of the normal line. For instance, the line L in the X-Y coordinates in FIG. 8 is expressed as the point 01 in the ρ-θ point coordinates in FIG. 9.

In this fashion, edge tracing may be performed based on binary-coded image information to obtain a continuous road edge. The Hough conversion, edge tracing and other appropriate processings may be performed simultaneously. Then, synthetic judgment may be made on the results of these processings to obtain precise road edge information. More accurate road edge information may be taken out when the above-mentioned image processings are made with developing an input image area as the vehicle travels.

Figure 3:
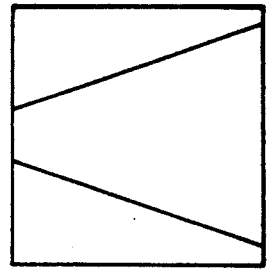
FIG. 3 shows an image obtained by projective transformation of the image shown in FIG. 2.

The image taken by a video camera represents a perspective view. The perspective road edge image as shown in FIG. 2 can be converted to non-perspective road edge image as shown in FIG. 3 according to the known projective conversion process.

The permissible travel path determining means 3 has projective conversion characteristics set in consideration of the perspective characteristics of associated video cameras.

Figure 4:
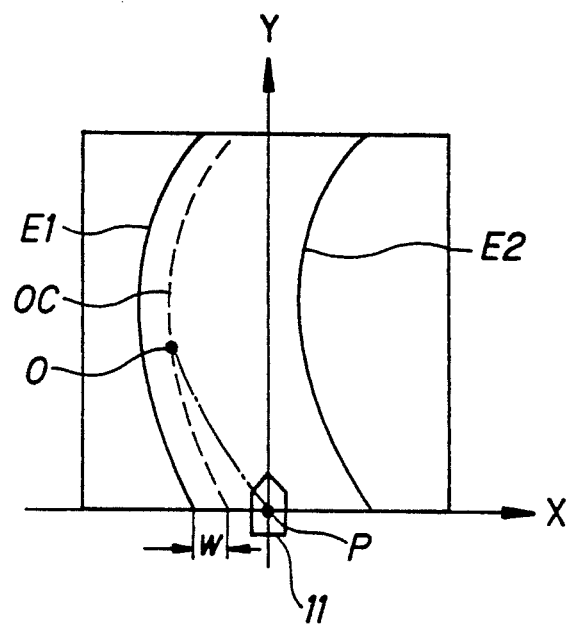
FIG. 4 shows an example of a target course set in a permissible area within a road width.

The permissible travel path determining means 3 can determine, on the basis of the non-perspective road image obtained by projective conversion, for instance, a path between the continuous road edges E1 and E2 shown in FIG. 4. When determining the permissible travel path RA in the X-Y coordinate system the Y-axis corresponds to the direction in which the image is pictured by the image pick-up device 1, i.e., the direction in which the vehicle travels.

In FIG. 4, a current or instantaneous position of the vehicle 11 is indicated at a point P, and the video camera of the image pick-up means 1 is mounted at a predetermined position on the vehicle such that the point P may appear at the center lower point of the display screen as the origin of the X-Y coordinates.

After a permissible travel path is determined by the permissible travel path determining means 3, the target course setting means 4 will select a course most appropriate for running in the permissible travel path, and will set the so selected course as a target course to follow.

Preferably, the course may be determined in consideration of the road contour and the running speed of the vehicle to meet the instantaneous travelling condition of the vehicle. However, the course may be basically determined using the width of the road as described more fully below.

If the target course setting means 4 finds that the width of the road exceeds a predetermined value, and the vehicle must keep to the left, a target course OC will be set a given constant distance "ω" (for instance, 1.5 meters) apart from the left edge of the road, as shown in FIG. 4.

If the width of the road is below the predetermined value, a target course will be set along the center line (not shown) of the road.

The coordinates of the target course are stored in the memories of the target course setting means 4 and are successively renewed as the vehicle is running. The divisions of the X-Y coordinates for the permissible travel path and the target course are selected in compliance with the magnification of the video camera of the image pickup device 1.

In FIG. 4, the trace of the vehicle from "P" to "O" represents the course actually followed by the vehicle under the control of the control means 5 until the vehicle has come to the target course OC at the point O.

According to the present invention, it is also possible to set a target course in consideration of the running condition of the vehicle as described below.

If the target course setting means 4 finds that the running speed measured by the speed sensor 6 is below a predetermined speed, the target course OC will be set in conformity with the road contour as shown in FIG. 4.

Figure 5A:
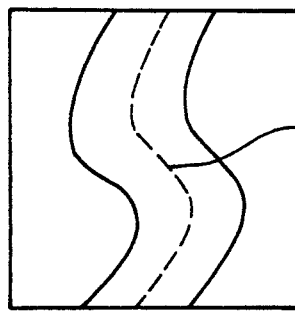
FIGS. 5(a) and 5(b) show target courses set on a road on which a vehicle is to travel at a low speed (a) and a high speed (b) respectively.
Figure 5B:
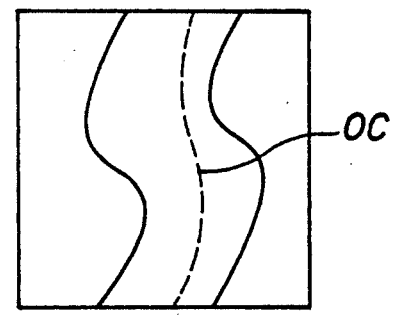
Figure 6:
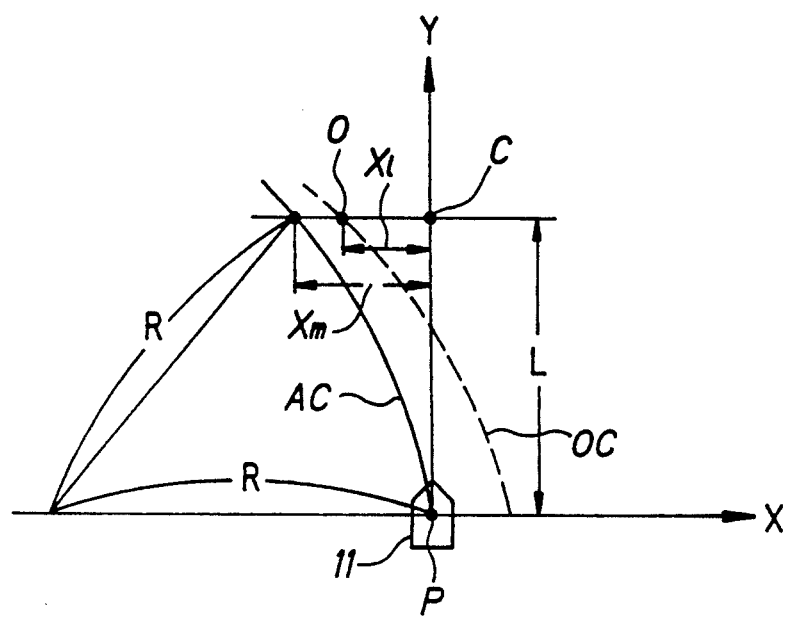
FIG. 6 shows a relationship between a target course and a presumed course.

When the running speed of the vehicle is higher than a predetermined speed, and when the vehicle is running a curved road as shown in FIG. 5(b), a target course OC of reduced curvature is set so as to reduce the lateral force which is applied to the vehicle.

After setting a target course in the permissible travel path, the control means 5 will estimate a steering correction necessary to permit the vehicle to follow the target course as follows:

To estimate needed steering correction, the control means 5 presumes a course along which the vehicle will run based on the currently detected running condition of the vehicle. Then, the control means 5 calculates a deviation of the presumed running course from the target course and determines an amount of steering angle correction necessary to bring the vehicle to follow the target course. Then the control means adjusts the steering of the vehicle according to the steering correction, i.e., the steering angle for correction.

In practice, for example, the position the vehicle will attain is represented as a point in the X-Y coordinate system wherein the Y-axis represents the running direction of the vehicle and the lateral deviation of the presumed point from the point of target position is measured to finally determine therefrom a corresponding amount of steering angle to be corrected.

Now it is assumed that a vehicle 11 at Point "P" shall be steered to get on the target course OC.

First, the distance L (m) (L=v×T ) on the Y-axis which the vehicle can run in T seconds will be determined on the basis of the vehicle's running speed v (m/s) which is determined by the speed sensor. Then, the lateral deviation ×1 from Point "C" (on which the vehicle would be in T seconds if it travelled straight along the Y-axis by the distance L) to the target course OC will be estimated.

Second, the course AC which the vehicle is supposed to follow will be estimated from the yaw rate T (rad/sec), and then the lateral deviation xm from point "C" to the presumed course AC will be estimated by the following equation:

$$xm = R - \{R^2 - (v \times tm)^2\}^{\frac{1}{2}} = R - R\{1 - (v \times tm/R)^2\}^{\frac{1}{2}}$$

where R stands for a radius of the presumed course AC.

When $R >> v \times tm$, we obtain $$xm = R - R\{1 - (v \times tm/R)^2/2\} \quad (1)$$
$$= v^2 \times tm^2/2R$$
$$= L^2/2R$$

$$T = v/R \quad (2)$$

From Equations (1) and (2)

$$xm = L^2 Y/2v \quad (3)$$

The positive sign of yaw rate Y represents that the presumed course AC turns to the left whereas the negative sign indicates the presumed course AC turning to the right.

The yaw rate $\Delta Y$ to which the yaw rate of the vehicle is to be corrected will be determined from the following equation:

$$\Delta Y = e \times 2v/L^2 \quad (4)$$

Figure 7:
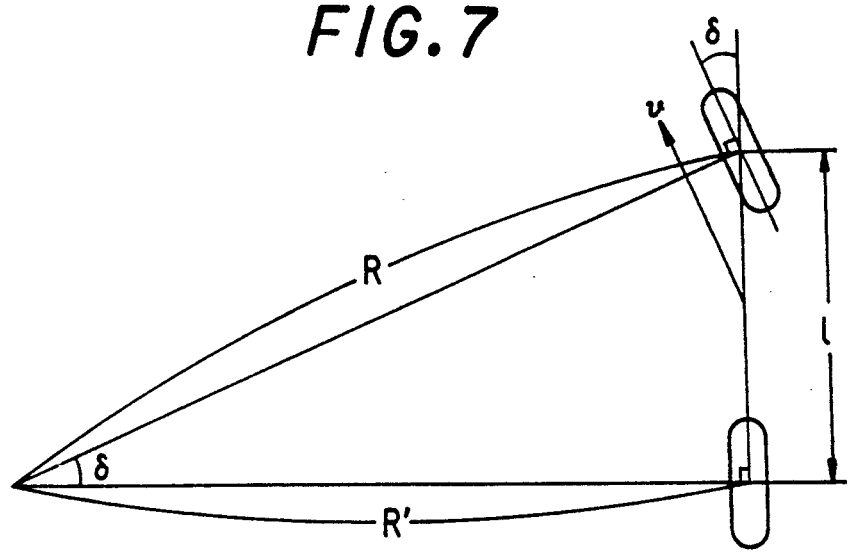
FIG. 7 shows a relationship between a vehicle's steering angle and its turning radius.

Then, on the basis of the tire angle $\delta$ detected at point "P" by the steering angle sensor $\delta$, the steering correction $\delta'$ for permitting the vehicle to get on the target course OC can be determined as follows:

Referring to FIG. 7, when $R >> 1$, the following equation can be obtained:

$$\delta = l/R \quad (5)$$

From equations (2) and (5) we can derive $$\delta = (l/v)Y \quad (6)$$

where l stands for wheel base. According to the equation (6) the tire angle $\Delta \delta$ for correction in accordance with the yaw rate $\Delta Y$ to be corrected can be given by the following equation:

$$\Delta \delta = (l/v)\Delta Y \quad (7)$$

In consideration of a usual equation of steering angle in relation to the running speed, i.e., substituting $1 = (1 + Kv^2)$ into the equation (7), we can obtain $$l\delta = \Delta Y\}l(1 + Kv^2)/v) \quad (8)$$

where "K" is a constant which is determined both from the tire characteristics and the vehicle characteristics.

Therefore, a steering correction $\delta'$ for permitting the vehicle to get on the target course can be obtained by the following equation:

$$\delta' = \delta + \Delta \delta \quad (9)$$

In response to the steering correction $\delta'$ given from the control means 5 the steering control 9 issues a drive command to the steering drive 10 which in turn steers the vehicle toward the target course OC.

The above-mentioned processing operations will be repeated at specified intervals of several milliseconds. Thus, the steering control of the vehicle may be continuously performed to permit the vehicle to automatically follow the target course OC.

The above-mentioned automatic travelling apparatus has the following problem. While the vehicle negotiates a curve, its body may deviate from the actual running direction due to the affection of a side-slip angle. Thus, the monitoring direction of the image pick-up device may deviate from the actual running direction of the vehicle.

Figure 10A:
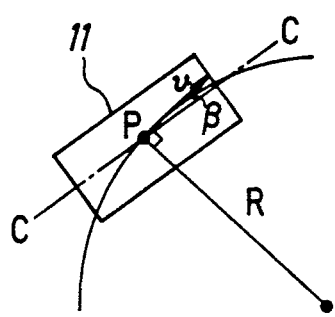
FIGS. 10(a) and (b) show how a vehicle makes steady turns at high (a) and low (b) running speeds respectively.
Figure 10B:
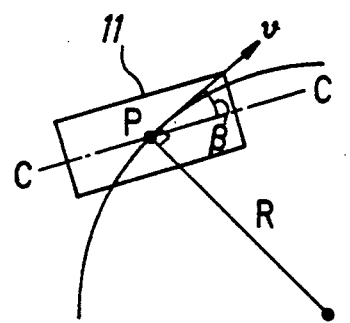

As shown in FIGS. 10(a) and (b), while making a steady circular turn, a vehicle 11 may have a difference between its body direction and running direction (indicated by vector "v"), which corresponds to a side-slip angle "$\beta$" which is proportional to the vehicle's running speed. FIG. 10(a) shows the state of the vehicle turning at a lower speed, and FIG. 10(b) shows the state of the vehicle turning at a higher speed. The higher the vehicle's running speed "v" is, the larger its side-slip angle "$\beta$" is.

Figure 11A:
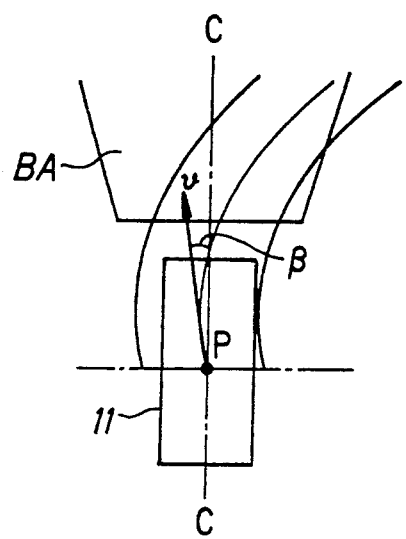
FIGS. 11(a) and (b) show image conditions when a vehicle makes steady turns at high (a) and low (b) running speeds respectively.
Figure 11B:
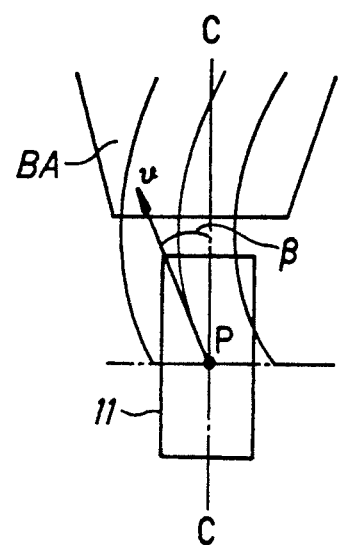
Figure 12:
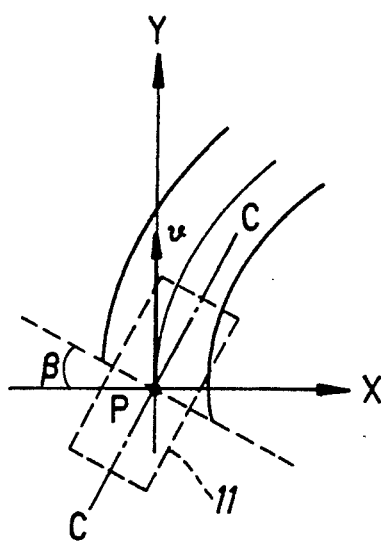
FIG. 12 shows an image turned by a side-slip angle of a vehicle.

In this case, an image taken by a video camera (image pick-up device 1) which is attached to the vehicle 11 in such a way so as to take a picture of an area ahead of the vehicle 11 in the direction along a center line c—c may turn around the same circle but monitor a front area having a deflection of its axis from the center line c—c by a side-slip angle "$\beta$", the value of which is proportional to the vehicle's running speed. This relationship is shown in FIG. 11(a) and (b) wherein "BA" denotes a front area image taken by each video camera.

Consequently, if the apparatus determines a permissible travel path on the basis of an image taken by the video camera when the vehicle has a side-slip angle $\beta$, and if the apparatus sets therein a target course and estimates a steering correction for permitting the vehicle to follow the target course, the steering correction may include an error corresponding to the side-slip angle of the vehicle.

In order to eliminate the above-mentioned problem, the automatic travelling apparatus according to the present invention includes means for determining a side-slip angle $\beta$ of the vehicle and means for converting an image taken while the vehicle has a side-slip angle into a front area image viewed in the running direction.

These means will work in the image processing means 2.

The means for converting an image to account for side-slip angle turns the taken image by the determined side-slip angle about a center point P in such way so as to bring the actual running direction represented by a vector "v" into coincidence with the Y-axis of the X-Y coordinates. The image turning is computed according to a specified operational expression on the basis of the image data.

The automatic travelling apparatus according to the present invention can determine a permissible travel path in the X-Y coordinates based on the image thus corrected for the side-slip angle of the vehicle, set a target course in the permissible travel path and estimate a steering correction necessary for following the target course, thereby permitting the vehicle to keep the target course with no affection of the vehicle's side-slip angle $\beta$.

In addition to the above-mentioned image turning process in the image processing means 2, it is also possible to eliminate an error due to a side-slip angle $\beta$ of the vehicle by turning the permissible travel path by the side-slip angle $\beta$ in the means 3 for determining a permissible travel path.

If a target course is set in the permissible travel path pattern thus turned for correction and a steering amount is estimated in relation to said target course, the steering control may be conducted with no affection of the side-slip angle $\beta$.

Besides the above-mentioned two turning processes, it is also possible to eliminate an error due to a side-slip angle of the vehicle by turning the target course by the side-slip angle $\beta$ in the target course setting means 4.

In this case the steering control may be conducted with no affection of the side-slip angle $\beta$ if a steering amount is estimated in relation to the target course pattern thus turned for due correction.

A side-slip angle $\beta$ of a vehicle is given by the following formula:

$$\beta = (I \cdot Cf \cdot S/v + Cf \cdot Cr \cdot l \cdot b/v^2 - M \cdot Cf \cdot a) \times \delta / \Delta\alpha(S) \quad (10)$$

$$\Delta\alpha(S) = I \cdot M \cdot S^2 + \{(Cf \cdot a^2 + Cr \cdot b^2)M + (Cf + Cr)I\}(S/V) + Cf \cdot Cr \cdot l^2 (1 + Kv^2)/v^2 \quad (11)$$

$$K = (Cr \cdot b - Cf \cdot a)M/Cf \cdot Cr \cdot l^2 \quad (12)$$

where I is a moment of inertia of a vehicle, v is a running speed of a vehicle, M is a vehicle's weight, Cf, Cr are cornering powers of front and rear tires respectively, a, b are distances from the vehicle gravity center to front and rear tires respectively, l is a wheel base, $\delta$ is a steering angle, and S is a Laplace operator.

Values of side-slip angle "$\beta$" of a vehicle at different values of vehicle's running speed "v" and of steering angle "$\delta$" may be precalculated and stored in a memory table. Thus, when a running speed "v" and a steering angle "$\delta$" are detected by a running speed sensor and a steering angle sensor respectively, a corresponding value of side-slip angle "$\beta$" may be read out from the memory table.

Figure 13:
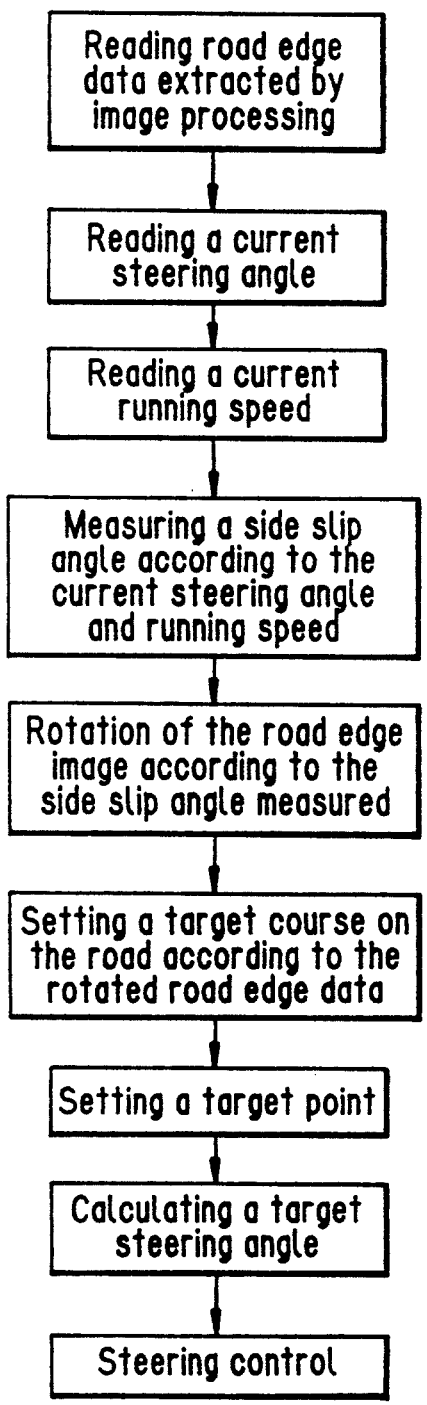
FIG. 13 shows an example of a flow of control according to the present invention.

FIG. 13 shows an example of control flow according to the present invention.

As is apparent from the foregoing description, the automatic travelling apparatus according to the present invention offers such an advantage that when conducting a control cycle including: taking an image of an area ahead of a vehicle in its running direction by an image pick-up device fixed to the vehicle; determining, by processing the taken image, a permissible travel path in an X-Y coordinate system having the Y-axis corresponding to the axis of the vehicle's running direction; setting a target course in the determined permissible travel path; estimating a steering amount necessary for permitting the vehicle to follow the target course on the basis of the detected running condition of the vehicle; and steering the vehicle to follow the target course with reference to the steering amount; it is capable of determining a side-slip angle of the vehicle and rotating the image, the permissible travel path or the target course by the determined side-slip angle to bring the actual running direction of the vehicle into coincidence with the direction of the Y-axis. Thus, the vehicle is permited to accurately follow the target course with no affection of the side-slip angle.

What is claimed is:

1. A control system for a vehicle comprising:
   an image pick-up device attached to said vehicle for generating an image of an area in a direction of travel of said vehicle;
   permissible travel path determining means for processing said image generated by said image pick-up device and for determining a permissible travel path in an X-Y coordinate system, wherein a Y axis of said coordinate system corresponds to said direction of travel of said vehicle;
   target course setting means for setting a target course along said permissible travel path;
   sensing means for detecting an instantaneous running condition of said vehicle;
   side-slip angle adjustment means for determining a side-slip angle of said vehicle and for rotating said permissible travel path to compensate for said side-slip angle and to produce a corrected permissible travel path;
   control means for determining a steering correction to permit said vehicle to follow said target course, said determination of said steering correction being based on said instantaneous running condition of said vehicle and said corrected permissible travel path; and
   steering control means for steering said vehicle in response to said steering correction determination.

2. A control system for a vehicle comprising:
   an image pick-up device attached to said vehicle for generating an image of an area in a direction of travel of said vehicle;
   permissible travel path determining means for processing said image generated by said image pick-up device and for determining a permissible travel path in an X-Y coordinate system, wherein a Y axis of said coordinate system corresponds to said direction of travel of said vehicle;
   target course setting means for setting a target course along said permissible travel path;
   sensing means for detecting an instantaneous running condition of said vehicle;
   side-slip angle adjustment means for determining a side-slip angle of said vehicle and for rotating said target course to compensate for said side-slip angle and to produce a corrected target course;
   control means for determining a steering correction to permit said vehicle to follow said corrected target course, said determination of said steering correction being based on said instantaneous running condition of said vehicle and said determined permissible travel path; and
   steering control means for steering said vehicle in response to said steering correction determination.

3. A control system for a vehicle comprising:
   an image pick-up device attached to said vehicle for generating an image of an area in a direction of travel of said vehicle;
   side-slip angle adjustment means for determining a side-slip angle of said vehicle and for rotating said image generated by said image pick-up device to compensate for said side-slip angle and to generate a corrected image;
   permissible travel path determining means for processing said corrected image and for determining a permissible travel path in an X-Y coordinate system, wherein a Y axis of said coordinate system corresponds to said direction of travel of said vehicle;
   target course setting means for setting a target course along said permissible travel path;
   sensing means for detecting an instantaneous running condition of said vehicle;
   control means for determining a steering correction to permit said vehicle to follow said target course, said determination of said steering correction being based on said instantaneous running condition of said vehicle and said determined permissible travel path; and steering control means for steering said vehicle in response to said steering correction determination.

4. A machine implemented process for controlling a vehicle comprising the steps of:
- generating an image of an area in a direction of travel of said vehicle using an image pick-up device attached to said vehicle;
- processing said image generated by said image pick-up device and to determine a permissible travel path in an X-Y coordinate system, wherein a Y axis of said coordinate system corresponds to said direction of travel of said vehicle;
- setting a target course along said permissible travel path;
- detecting an instantaneous running condition of said vehicle;
- determining a side-slip angle of said vehicle;
- rotating said permissible travel path to compensate for said side-slip angle to produce a corrected permissible travel path;
- determining a steering correction to permit said vehicle to follow said target course, said determination of said steering correction being based on said instantaneous running condition of said vehicle and said corrected permissible travel path; and
- steering said vehicle in response to said steering correction determination.

5. A machine implemented process for controlling a vehicle comprising the steps of:
- generating an image of an area in a direction of travel of said vehicle using an image pick-up device attached to said vehicle;
- processing said image generated by said image pick-up device to determine a permissible travel path in an X-Y coordinate system, wherein a Y axis of said coordinate system corresponds to said direction of travel of said vehicle;
- setting a target course along said permissible travel path;
- detecting an instantaneous running condition of said vehicle;
- determining a side-slip angle of said vehicle;
- rotating said target course to compensate for said side-slip angle and to produce a corrected target course;
- determining a steering correction to permit said vehicle to follow said corrected target course, said determination of said steering correction being based on said instantaneous running condition of said vehicle and said determined permissible travel path; and
- steering said vehicle in response to said steering correction determination.

6. A machine implemented process for controlling a vehicle comprising the steps of:
- generating an image of an area in a direction of travel of said vehicle using an image pick-up device;
- determining a side-slip angle of said vehicle;
- rotating said image generated by said image pick-up device to compensate for said side-slip angle and to generate a corrected image;
- processing said corrected image to determine a permissible travel path in an X-Y coordinate system, wherein a Y axis of said coordinate system corresponds to said direction of travel of said vehicle;
- setting a target course along said permissible travel path;
- detecting an instantaneous running condition of said vehicle;
- determining a steering correction to permit said vehicle to follow said target course, said determination of said steering correction being based on said instantaneous running condition of said vehicle and said determined permissible travel path; and
- steering said vehicle in response to said steering correction determination.

7. A control system for a vehicle comprising:
- an image pick-up device attached to said vehicle for generating an image of an area in a direction of travel of said vehicle; and
- a microcomputer aided control system for
- processing said image generated by said image pick-up device and for determining a permissible travel path in an X-Y coordinate system, wherein a Y axis of said coordinate system corresponds to said direction of travel of said vehicle;
- setting a target course along said permissible travel path;
- detecting an instantaneous running condition of said vehicle;
- determining a side-slip angle of said vehicle and for rotating said permissible travel path to compensate for said side-slip angle and to produce a corrected permissible travel path;
- determining a steering correction to permit said vehicle to follow said target course, said determination of said steering correction being based on said instantaneous running condition of said vehicle and said corrected permissible travel path; and
- steering said vehicle in response to said steering correction determination.

* * * * *